United States Patent
Jones et al.

(10) Patent No.: US 7,346,530 B2
(45) Date of Patent: Mar. 18, 2008

(54) FLEXIBLE ORDERING OF INVENTORY FROM MATERIAL SOURCES ACCORDING TO MATERIAL REQUIREMENTS FOR MANUFACTURING OPERATIONS

(75) Inventors: Kevin T. Jones, Austin, TX (US); Melissa Beebe, Cedar Park, TX (US); Shafali Rastogi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1617 days.

(21) Appl. No.: 09/774,330

(22) Filed: Jan. 31, 2001

(65) Prior Publication Data

US 2002/0103726 A1     Aug. 1, 2002

(51) Int. Cl.
    G05B 19/418    (2006.01)
(52) U.S. Cl. ............................................ 705/8
(58) Field of Classification Search ............... 705/8
     See application file for complete search history.

(56) References Cited

U.S. PATENT DOCUMENTS

| | | |
|---|---|---|
| 4,336,589 A | 6/1982 | Smith et al. |
| 4,669,047 A | 5/1987 | Chucta |
| 5,040,123 A | 8/1991 | Barber et al. |
| 5,193,065 A | 3/1993 | Guerindon et al. |
| 5,450,317 A | 9/1995 | Lu et al. |
| 5,608,621 A | 3/1997 | Caveney et al. |
| 5,712,989 A | 1/1998 | Johnson et al. |
| 5,946,663 A | 8/1999 | Tanaka et al. ................. 705/8 |
| 5,991,732 A | 11/1999 | Moslares ....................... 705/8 |
| 6,105,520 A | 8/2000 | Frazer et al. ................ 112/117 |
| 6,144,945 A | 11/2000 | Garg et al. .................... 705/28 |
| 2002/0188499 A1* | 12/2002 | Jenkins et al. ................ 705/10 |

FOREIGN PATENT DOCUMENTS

JP          9-290351 A   * 11/1997

OTHER PUBLICATIONS

U.S. Appl. No. 60/243,400.*
Mukhopadhyay, Samar K. "Optimal Scheduling of Just-in-Time Purchase Deliveries." International Journal of Operations & Production Management, vol. 15, No. 9, pp. 59-69, 1995.*

* cited by examiner

Primary Examiner—Susanna M. Diaz
(74) Attorney, Agent, or Firm—Hamilton & Terrile, LLP; Stephen A. Terrile

(57) ABSTRACT

A method, computer system, computer program product, and signal embodied on a carrier wave for scheduling delivery of material to a manufacturer with a plurality of manufacturing lines. Each manufacturing line may include at least one operation, and deliveries are made according to the material requirements for the operation. Parts and/or raw materials are requested and delivered to an operation of at least one operation on a manufacturing line in the factory from in-house and external inventory based upon the work scheduled for that operation. Deliveries are scheduled continuously to allow changes in truck arrival schedules from material sources and changes in material requirements. Requests for materials to be delivered are delayed until the last possible moment for making the request to allow for these changes and to ensure that inventory is stored at a manufacturing line and/or operation for minimum time prior to the time the material is needed.

8 Claims, 8 Drawing Sheets

FLEXIBLE ORDERING OF INVENTORY FROM MATERIAL SOURCES ACCORDING TO MATERIAL REQUIREMENTS FOR MANUFACTURING OPERATIONS

CROSS-REFERENCE TO RELATED APPLICATIONS

This application relates to application Ser. No. 09/774,396, filed on same day herewith, entitled "Pull to Customer Order Demand Fulfillment System and Method" and naming as inventors David J. Lyon, Tomasz P. Wala, Mark R. Graban, Lee B. Beard, Kevin T. Jones, and Thomas J. Clark, the application being incorporated herein by reference in its entirety.

BACKGROUND OF THE INVENTION

1. Field of the Invention

The present invention relates generally to factory systems and, more particularly, to a method and system for scheduling delivery of materials from in-house and/or external inventories for use in manufacturing items. Deliveries are scheduled according to material requirements for manufacturing operations.

2. Description of the Related Art

Scheduling work in a manufacturing environment is a complex process. Most factories use an automated planning and scheduling system to ensure that customer demand is satisfied in a timely manner with minimum inventory. To achieve this goal, such planning requires that work for each manufacturing line is efficiently scheduled, that the appropriate materials needed to complete each task performed are available when needed on the manufacturing line, and that products are manufactured in the order that the products are needed. To produce a manufacturing schedule, customer orders must be received and analyzed, priorities must be assigned to items to be manufactured, manufacturing resources must be allocated, work must be scheduled, raw materials and/or parts must be obtained and delivered to the manufacturing line, work in progress must be tracked, and variability in availability of raw materials and/or parts must be handled. Many manufacturing facilities plan and manage these many tasks by combining multiple computerized planning and scheduling systems with paper-based management systems.

An example of a widely-used commercially available automated planning and scheduling system is i2 Technologies, Inc.'s Factory Planner and Rhythm Collaboration Planner. The i2 Factory Planner generates work schedules and material requirements schedules using customer-provided inputs of demand and inventory. The i2 Rhythm Collaboration Planner helps organizations to quote and promise order delivery to customers in real-time while obeying customer constraints on lot sizes, number of shipments, and time between shipments. The i2 Rhythm Collaboration Planner helps provide a global view of the entire supply chain from sourcing to delivery. These products handle the complicated scheduling for large, distributed, complex manufacturing environments. However, any automated planning and scheduling system can only produce accurate results if inputs to the system are accurate.

Most businesses schedule deliveries of materials for manufacturing activities based upon forecasts of demand for products. Work is typically scheduled on a daily or weekly basis to meet demand predicted based on past sales. Inputs to the automated planning and scheduling system are demand forecasts.

To ensure that demand is satisfied, most factories maintain inventories of both parts and/or raw materials. Each type of inventory typically includes stock to accommodate the average usage rate and stock to meet variations in demand. However, maintaining high inventory levels does not necessarily guarantee that the right inventory is available when and where it is needed. A material delivery schedule is needed that delivers material to the manufacturing line prior to the time the material is needed during manufacturing.

Furthermore, due to limited space in most factories and the expense of maintaining warehouses of inventory, it is desirable to maintain only the minimum inventory necessary to meet demand. Some factories operate on a build-to-customer-order model where no product is manufactured unless it has been ordered by a customer. This model enables the factory to operate with minimal inventory of finished products, but does not address the inventories of materials.

In additional to minimizing material inventory, it is also desirable to minimize material handling to ensure that materials are delivered to the right location at the right time.

Problems with scheduling deliveries of materials for manufacturing activities are exacerbated in a mass production manufacturing environment for commodities that are built to customer orders. The term commodity is used herein to describe a mass-produced unspecialized product. In such an environment, the timeframes for manufacturing and delivery activities may be sub-hourly. Demand forecasts do not reliably predict material needs at this level, and schedules based upon demand forecasts become less and less accurate as time elapses between the time the work is scheduled and the time the materials to perform the work arrive on the manufacturing line. Nor do demand forecasts respond to variations in material needs resulting from atypical customer orders. Scheduling based upon demand forecasts does not provide the responsiveness to changes in inventory, work schedules, and delivery schedules needed to ensure that materials are delivered to the right place at the right time.

What is needed is a way to allow flexibility in ordering inventory from material sources according to material requirements for manufacturing operations. The solution should produce a material delivery schedule for delivery of materials from in-house and/or external inventories to operations on the manufacturing lines before the materials are needed in manufacturing the commodities. The material delivery schedule should be generated as often as is necessary to reflect changing material requirements needs and changing truck arrival schedules from material sources.

SUMMARY OF THE INVENTION

The present invention provides a method, computer system, computer program product, and signal embodied on a carrier wave for scheduling delivery of material to a manufacturer with a plurality of manufacturing lines. Each manufacturing line may include at least one operation, and deliveries are made according to the material requirements for the operation. Deliveries are scheduled to enable the manufacturer to operate the factory with minimal in-house inventory of parts and/or raw materials. Parts and/or raw materials are requested and delivered to an operation of at least one operation on a manufacturing line in the factory from in-house and external inventory based upon the work scheduled for that operation. Deliveries are scheduled continuously to allow for changes in truck arrival schedules from material sources and changes in material requirements. Requests for materials to be delivered are delayed until the last possible moment for making the request to allow for these changes as well as to ensure that inventory is stored at a manufacturing line and/or operation for as short a time as is possible prior to the time the material is needed.

In one aspect of the invention, a method for scheduling delivery of material to a manufacturer with a plurality of manufacturing lines is given. The method includes determining a material requirement for an operation of at least one operation on a manufacturing line of the plurality of manufacturing lines and scheduling delivery of material to meet the material requirement from an available inventory of material to the operation on the manufacturing line.

In another aspect of the invention, a method repeats a series of steps. The series of steps includes obtaining a material requirement for an operation on a manufacturing line from a plurality of material requirements, where each material requirement of the plurality of material requirements comprises an identified material and a material need-by time. Another step in the series includes identifying a next truck scheduled for delivery to the operation, wherein the next truck originating at a material source. Another step of the series includes determining whether a following truck scheduled for delivery to the operation after the next truck has a material delivery time before the material need-by time of the material requirement. When the following truck has a material delivery time before the material need-by time, processing of the material requirement is delayed. When the following truck has a material delivery time after the material need-by time, a determination is made whether a later opportunity to request the identified material exists. If a later opportunity exists, requesting the identified material and scheduling a delivery of the identified material are delayed. When a later opportunity does not exist, the identified material is requested by adding the identified material to a material request for the next truck and a delivery of the identified material from the material source to the operation on the next truck is scheduled.

In yet another aspect of the invention, the previously described series of steps is repeated essentially continuously. In a further aspect of the invention, the previously described series of steps is repeated at a fixed time interval.

Other aspects of the invention include a computer system, a computer program product, and a signal embodied on a carrier wave having instructions for implementing the methods described above.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
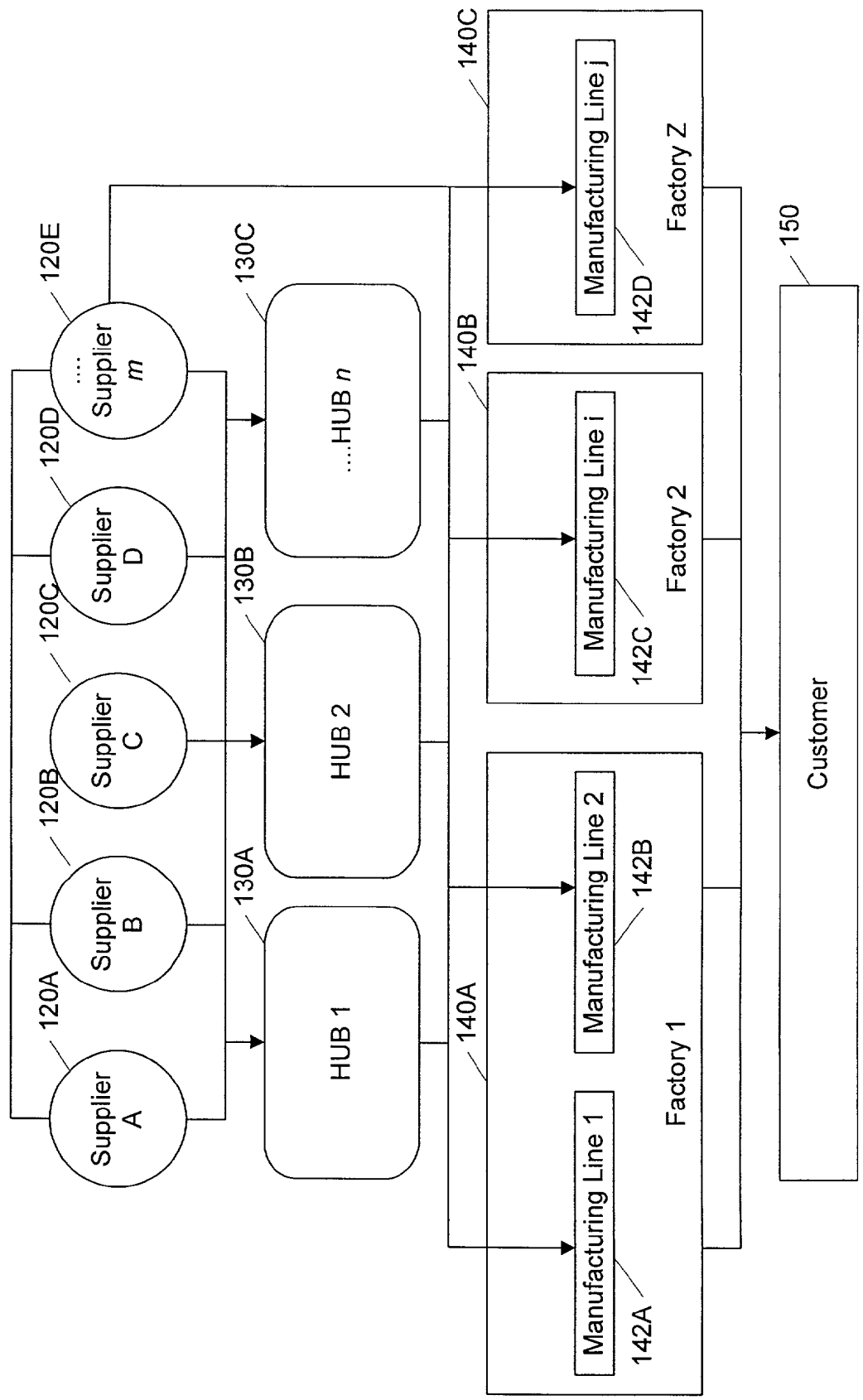
FIG. 1 is a flow diagram showing an example of a supply chain for a manufacturer having several factories.

The following is intended to provide a detailed description of an example of the invention and should not be taken to be limiting of the invention itself. Rather, any number of variations may fall within the scope of the invention which is defined in the claims following the description.

In the demand fulfillment system and method of the present invention, the inefficiencies resulting from using demand forecasts are overcome by using customer orders, material availability, and material replenishment times to plan work schedules and material delivery schedules for multiple operations and/or manufacturing lines of a factory.

In the manufacturing environment described herein, a customer places a customer order for one or more products, such as a computer system. A customer may be an individual or a business entity. The product(s) are built according to the specifications provided by the customer in the customer order and may include one or more components. Generally each component is a commodity that is mass-produced and unspecialized. For example, the customer ordering a computer system product may specify several components such as a processor, monitor, printer, and so on, each of which is mass-produced. The customer order specifies the particular components to be assembled to provide the computer system product.

For simplification purposes, examples used herein may describe a customer order for a single item, wherein an item may represent either a product or a component of a product as described above. The scope of the invention is not so limited, and the invention encompasses the fulfillment of customer orders for multiple products including multiple components. A customer order therefore may include many items and/or multiple quantities of a single item. When a customer order has a single item, as in some examples herein, the assignment of a manufacturing line to fulfill the customer order by manufacturing the item is also an assignment of a manufacturing line to the customer order.

Some items may be manufactured by the manufacturer and other items may be purchased from a supplier but sold as part of a product offered to customers. For instance, the manufacturer of the computer system described above may obtain a monitor from a supplier rather than manufacture the monitor itself.

The term material is used herein to describe raw materials and/or parts used to manufacture an item. For items which are purchased from a supplier and not manufactured in-house, the term material may be used to describe the item itself.

The demand fulfillment system and method of the present invention generates a work schedule for items to be manufactured and a material delivery schedule for materials to be delivered to manufacture the items.

A work schedule includes a time and location for each item to be manufactured. The location may specify a manufacturing line and/or an operation of at least one operation on a manufacturing line to manufacture the item. A material delivery schedule identifies a material, a quantity, a material need-by time, and a delivery location (an operation and/or manufacturing line) for each material required to fulfill the work schedule. The material delivery schedule is used to ensure that materials needed to manufacture the items are delivered to the location they are needed on the manufacturing line prior to the time when manufacturing the item is to begin. The material delivery schedule is developed on a just-in-time basis so that materials are delivered to the manufacturing line just prior to the time that the material is needed for manufacturing the item.

FIG. 1 shows a supply chain for a manufacturer of items according to one embodiment of the invention. Each supplier 120 such as suppliers 120A through 120E supplies parts and/or raw materials, collectively called materials, to the manufacturer. Rather than maintaining a warehouse of materials, the manufacturer obtains materials from at least one external material source. Examples of external material sources include hub 130A, hub 130B, and hub 130C and suppliers 120A through 120E. Each hub is in close proximity to one of the manufacturer's factories, each factory being a factory 140, such as factories 140A, 140B and 140C. Each factory has at least one manufacturing line such as manufacturing lines 142A through 142D. Each manufacturing line may have one or more manufacturing operations (not shown). For factories having multiple manufacturing lines, materials from hubs and suppliers are delivered directly to the operation and/or manufacturing line that needs the material rather than to a general delivery area that serves all operations and/or manufacturing lines for the entire factory.

The term hub is used herein to describe an intermediate business that agrees with the manufacturer to maintain high levels of inventory of materials that can be delivered to the manufacturer's factory on short notice upon request. The hub makes its own arrangements with suppliers to provide material to a storage location for hub inventory. A hub may be referred to as a Supplier Logistics Center (SLC).

Suppliers may also supply parts and/or raw materials directly to the operation and/or manufacturing line upon request. In the context of the present invention, each external material source such as a hub or a supplier has its own inventory data (not shown). The manufacturer has access to the external material sources' inventory data. The manufacturer manufactures the finished products that have been ordered by customers such as customer 150.

Figure 2:
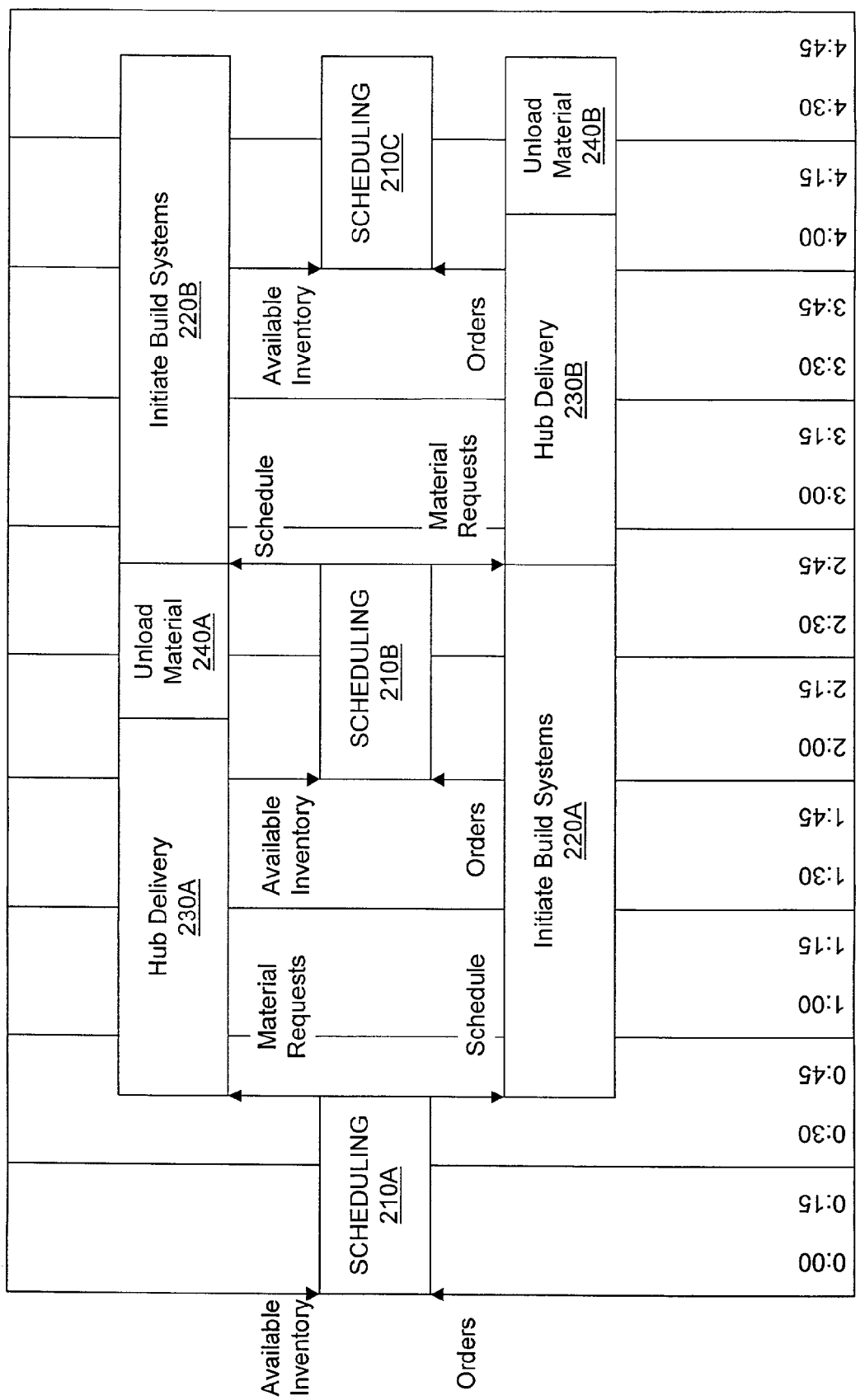
FIG. 2 shows a timeline for scheduling work and delivery of materials for a manufacturing line, receiving deliveries of material from a hub, and initiating work on the manufacturing lines according to the work schedule.

FIG. 2 shows an example of a timeline of activity on a manufacturing line according to the present invention. In this example, work is scheduled every two hours and materials are requested from a hub, an external material source. At time 0:00 shown in FIG. 2, customer orders and available inventory are provided as inputs to schedule work and deliveries of materials to the factory's operations and/or manufacturing lines.

Available inventory includes external inventory as shown in external inventory data, in this case, the hub's inventory data. Available inventory also includes in-house inventory of materials that were requested and delivered from an external material source, but that are not currently allocated to a customer order. While one of the objectives of the present invention is minimize or eliminate the need for an in-house inventory of materials, excess materials may accumulate when work is rescheduled or when excess parts are delivered by an external material source. This in-house inventory may be stored in a storage room at a manufacturing line or in an excess stock storage room.

The timeline shows three examples of scheduling blocks that occur during an example five-hour time period: scheduling block 210A beginning at time 0:00, scheduling block 210B beginning at time 2:00, and scheduling block 210C beginning at time 4:00. For illustration purposes, scheduling block 210A is shown prior to any delivery of material to the manufacturing line. Scheduling blocks 210B and 210C illustrate scheduling after some material has been delivered by hubs to the manufacturing lines. This material from hubs was requested from the hubs during the preceding scheduling block. For example, for scheduling block 210C, available inventory includes in-house inventory of materials that were requested during scheduling block 210B and delivered during hub delivery block 230B. Available inventory also includes materials available from external material sources, as shown in external inventory data.

In the example shown in FIG. 2, each scheduling block allows 45 minutes to generate a schedule. A scheduling block is constrained by the length of time that the scheduling software needs to run. In each scheduling block, such as scheduling block 210A beginning at time 0:00, a schedule is generated for all operations on all manufacturing lines using all outstanding customer orders and all available inventory. A schedule includes a work schedule for work to manufacture items in response to outstanding customer orders and constrained by material availability. A schedule identifies material requirements and may provide a material requirements schedule for materials to be used to perform the work. The work schedule identifies the items to be manufactured and a start time and location (operation and/or manufacturing line) for manufacturing each item.

The customer order identifies the materials that are needed to manufacture the item. A priority scheme may be used to assign inventory to a particular customer order to be built. For example, in one embodiment, unused in-house inventory already at the storage room for the manufacturing line assigned to the customer order receives the highest priority to be used in the next work schedule. In-house inventory stored in an excess stock storage room in the factory is given second highest priority; hub inventory is given third highest priority; and in-house inventory in a storage room for another manufacturing line is given lowest priority. This priority scheme minimizes in-house moves of materials. Other embodiments of the invention may use other methods or other priority schemes to assign materials to customer orders.

A material delivery schedule is developed from the work schedule and the manufacturing requirements so that all materials to be used in manufacturing an item are available at the operation and/or manufacturing line at the time needed for manufacturing the item. The scope of the invention includes staggered delivery of materials to the manufacturing line as items are being manufactured, as long as the material is available at the operation and/or manufacturing line when it is needed.

The present invention allows multiple scheduling blocks to occur during a single manufacturing shift. The term manufacturing shift is used herein to describe a typical manufacturing shift of approximately 8 hours during which mass production of items is continuously performed, although the number of hours in a manufacturing shift may vary. The multiple scheduling blocks produce multiple work schedules and multiple material delivery schedules for a single manufacturing line during each manufacturing shift. Scheduling work and material deliveries multiple times during the shift enables the factory to respond to changing material needs of each manufacturing line on a very short-term basis. Consider the example of FIG. 2 with a scheduling block every two hours. The schedule produced is used to initiate a work schedule after the scheduling block ends and to generate a material delivery schedule for deliveries prior to the next scheduling block, when a new material delivery schedule will be generated.

Replenishment time for material is taken into account when scheduling work. For example, if material that is needed is part of hub inventory, the work schedule must allow for the replenishment time to move the material from the hub inventory to the manufacturing line. Work using that material cannot be scheduled until after the replenishment time has passed. Replenishment time may also be needed for in-house inventory, but it should be shorter than the replenishment time needed for an external material source.

By taking account of replenishment time in scheduling work, the demand fulfillment system ensures that work is not scheduled to begin until all parts and/or materials needed for manufacturing the item are delivered to the operation and/or manufacturing line. Orders are not scheduled that cannot be completed due to missing parts.

At time 0:45, the schedule is provided to the manufacturing line and work included in the work schedule is initiated as shown in Initiate Build Systems block 220A. Also at approximately time 0:45, material requests are made in-house and externally (to the hub in this case) in preparation for the work schedule to begin in two hours. Hub Delivery block 230A and Hub Delivery block 230B show deliveries of materials from the hub in response to material requests at times 0:45 and 2:45, respectively.

The materials delivered prior to the next scheduling block are available as inventory for work to be subsequently scheduled. For example, materials that arrive prior to 2:00 are available as part of in-house inventory for scheduling block 210B. According to the present invention, material is requested so that the material received in response is available at the manufacturing line just in time for manufacturing the item. Material requests are made to ensure that a delivery of material in response to the material request is destined for a single manufacturing line.

Each scheduling block such as scheduling blocks 210A, 210B, and 210C produces another work schedule using all available customer orders and all available inventory. Initiate Build System block 220A shows initiation of the work schedule generated by scheduling block 210A, and Initiate Build System block 220B shows initiation of the work schedule generated by scheduling block 210B.

In the embodiment of the invention illustrated in FIG. 2, the work schedule is generated independently of previously generated work schedules, although other embodiments may update a previously generated work schedule. Often the work schedule generated at a given time, for example at time 0:00 including work scheduled from 2:00 to 4:00, corresponds directly to the work schedule generated two hours later, for example at 2:00, for the work scheduled for the same time period from 2:00 to 4:00. However, changes in customer orders and inventory during the two hours between scheduling may result in differences between the two work schedules.

Unload Material block 240A and Unload Material block 240B show unloading material received from hubs or from in-house inventory at the operation and/or manufacturing line that will use the materials. Unloading materials is expected to occur according to the material delivery schedule just in time for manufacturing the item.

Figure 3:
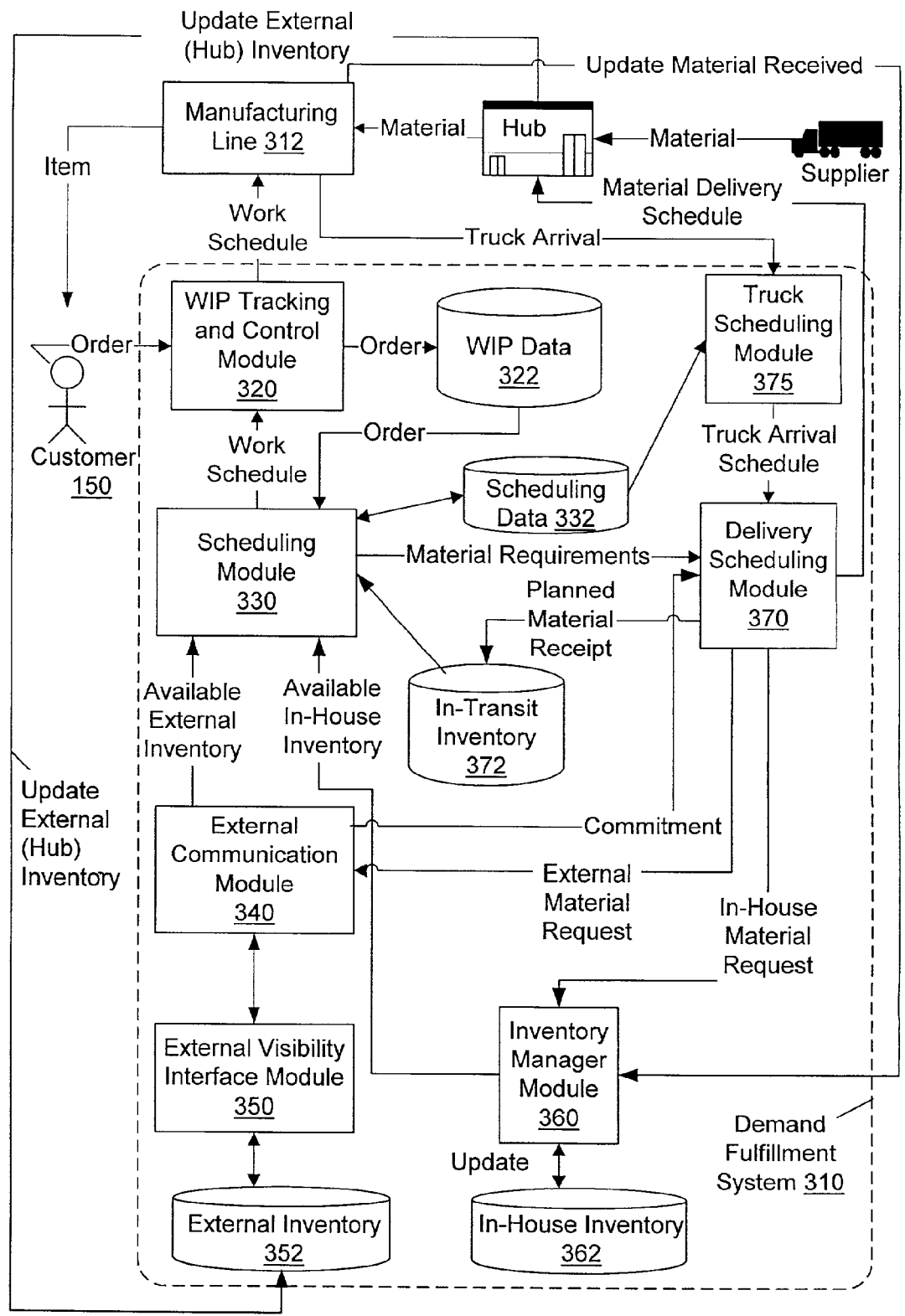
FIG. 3 shows the demand fulfillment system of the present invention and interactions between modules of the demand fulfillment system.

FIG. 3 shows demand fulfillment system 310 and interactions between modules of demand fulfillment system 310. Those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

In some embodiments, the functions of some modules of demand fulfillment system 310 may be provided by commercially available software packages. Other modules may manipulate the inputs and/or outputs as well as provide the necessary interfaces to in-house systems or external systems. For example, inputs are manipulated so that the output of the commercially available software packages is accurately based upon demand derived from customer orders, using materials available from in-house and hub inventory, and with replenishment times taken into account in scheduling work and deliveries of materials. Further manipulation of the output of the commercially available software may be necessary.

For example, in one embodiment, the functions of Scheduling module 330 are provided by i2 Factory Planner and the functions of Hub Communication module 340 are provided by i2 Rhythm Collaboration Planner. The invention is not limited to this embodiment, and the functions performed by each of these modules may be performed by modules specially developed for the demand fulfillment system, by a single module, or by other commercially available software.

In FIG. 3, a hub is used as an example of an external material source. WIP Tracking and Control module 320 controls work in progress (WIP) in the various manufacturing lines of the manufacturer, such as manufacturing line 312. When a customer 150 places a customer order, WIP Tracking and Control module 320 stores the customer order in WIP data 322 which is available to Scheduling module 330. Scheduling module 330 develops a work schedule using the customer order and various other inputs, as will be described below. Ultimately, Scheduling module 330 provides the work schedule that is used by WIP Tracking and Control module 320 to control the operations performed on the manufacturing lines, such as manufacturing line 312.

Scheduling module 330 also provides the material requirements that will be needed to perform the work schedule. Delivery Scheduling module 370 uses the material requirements to develop a material delivery schedule for delivery of materials to the operations and/or manufacturing lines.

Scheduling module 330 also compares the parts and/or raw materials needed to fulfill the customer order with available inventory to determine whether additional materials are needed to manufacture an item of the customer order. Because minimal inventory is maintained at the manufacturing lines, material requests must be issued to move materials to the manufacturing line, both from in-house inventory and from external inventory. Available external inventory and available in-house inventory comprise the available inventory that may be used to fulfill the material request. Scheduling module 330 may use and/or generate schedule data 332 to determine materials to perform certain work; for example, the material replenishment time may be used as part of identifying available inventory to fulfill the customer order.

Delivery Scheduling module 370 determines when a material request should be generated, typically at the last possible moment that will still meet a request deadline. The materials received in response to in-house material requests and external material requests are expected to be in place when the material is needed for manufacturing the item. Delivery Scheduling module 370 generates an in-house material request to Inventory Manager module 360, which manages in-house inventory, and/or an external material request such as a hub material request to External Communication module 340.

When Delivery Scheduling module 370 communicates an in-house material request, Inventory Manager module 360 obtains the available in-house inventory from In-House Inventory data 362. Inventory Manager module 360 communicates the available in-house inventory to Scheduling module 330. Available in-house inventory typically excludes in-house inventory already allocated to another customer order.

External Communication module 340 facilitates communication between the manufacturer and external delivery sources. When Delivery Scheduling module 370 communicates a hub material request, External Communication module 340 determines whether external inventory (here, hub inventory) is sufficient to meet the material request via External Visibility Interface module 350. External Visibility Interface module 350 provides an interface to external inventory data 352, which is data maintained by the external material source (the hub or supplier) rather than by the manufacturer. External Communication module 340 obtains a commitment from the external material source (here, the hub) for the amount of material the hub commits to provide to meet the material request.

External Communication module 340 communicates the available external inventory to Scheduling module 330. If an external material source cannot fulfill the entire material request, the manufacturer is automatically informed of the shortage via the commitment. The manufacturer can coordinate with the external material source to re-stock external inventory to meet demand and/or use another source.

In one embodiment of the invention, the demand fulfillment system and method also tracks in-transit inventory, also shown in FIG. 3 as in-transit inventory 372. In-transit inventory is inventory that has been committed by an external material source but not yet received at the manufacturing line. When a commitment from an external material source is received, Delivery Scheduling Module 370 uses the commitment to update in-transit inventory with a planned material receipt, thereby adding the material to in-transit inventory. In this embodiment, in-transit inventory is considered to be part of the available inventory and is used by Scheduling module 330 for scheduling work. When in-transit inventory is received at the manufacturing line, the material request is "closed" by "zeroing out" the corresponding in-transit inventory and adding the received material to in-house inventory.

Delivery Scheduling module 370 uses the material requirements generated by Scheduling module 330 and a truck arrival schedule to produce a material delivery schedule. The term truck arrival schedule is used herein to describe scheduled deliveries of available inventory to operations and/or manufacturing lines. A truck arrival schedule includes in-house deliveries from in-house inventory and/or deliveries of materials from external material sources. The term truck as used herein describes the transport mechanism used to move material from its storage location to the operation and/or manufacturing line.

A truck arrival schedule is used as input for each generation of a material delivery schedule to allow the factory to quickly adapt to changes in material needs and thus to schedule additional or fewer material deliveries.

When materials are received and/or distributed from in-house inventory, this information is entered into Inventory Manager module 360 and in-house inventory data 362 is updated. The arrival of a truck of materials is also entered into Truck Scheduling module 375, which maintains the truck arrival schedule of trucks scheduled to deliver materials from external inventory and/or in-house inventory.

By using a priority scheme to assign materials to customer orders such as that described above, the demand fulfillment system and method of the present invention are designed to ensure that in-house moves of material are rare and that in-house distribution of materials is performed as efficiently as possible. In addition, material requests are made so that each delivery of material is destined for a single operation and/or manufacturing line.

Figure 4:
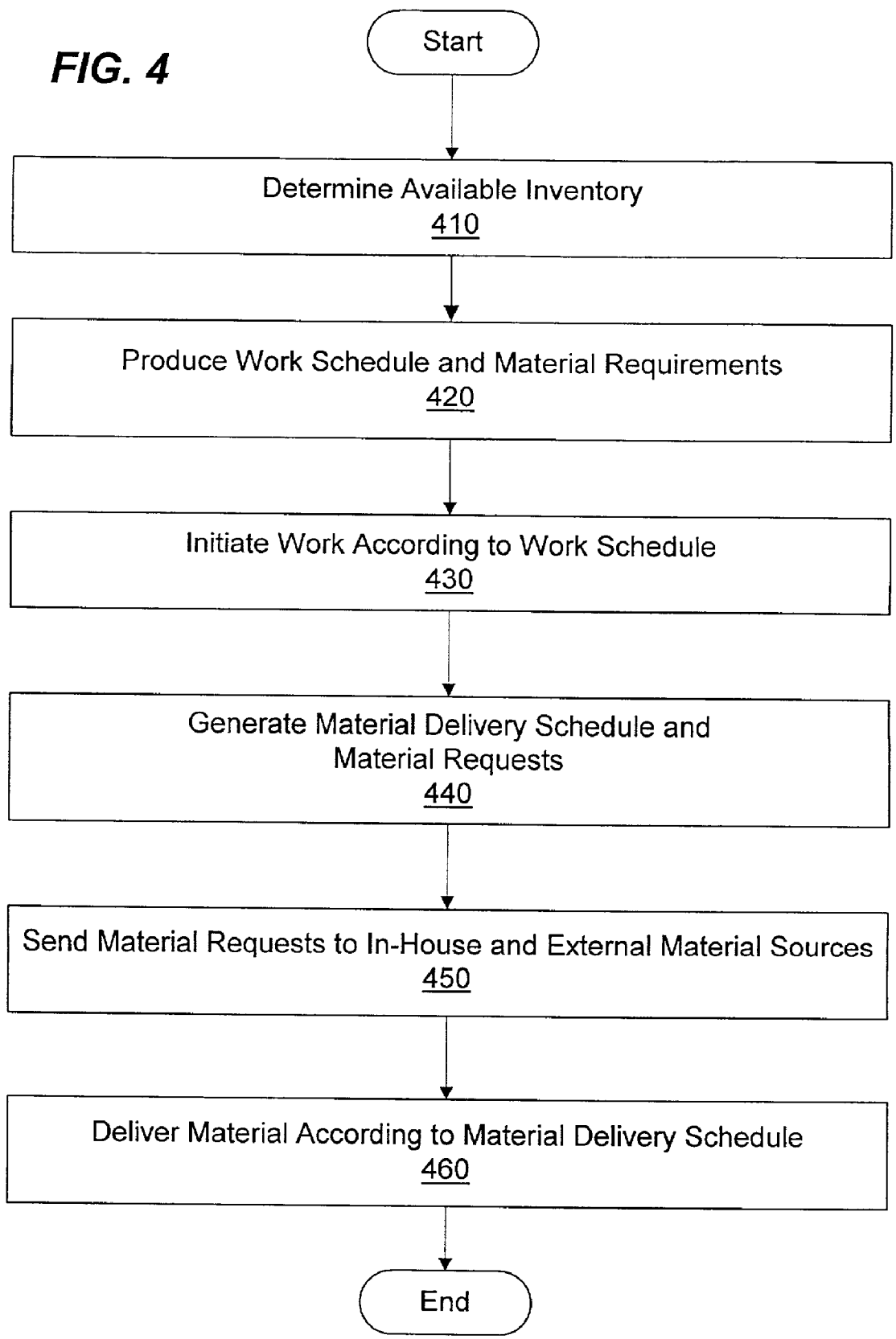
FIG. 4 shows the operation of the demand fulfillment system of FIG. 3.

FIG. 4 is a flowchart showing an overview of the operation of the demand fulfillment system of the present invention. A work schedule and a material delivery schedule are generated using customer orders and available inventory. The term customer order as used herein indicates an outstanding customer order for which manufacturing has not yet begun. Only outstanding customer orders are processed to generate the work schedule and material delivery schedule. The work schedule is used to initiate work on the manufacturing lines and the material delivery schedule is used to deliver materials to the manufacturing lines to perform the work. Although assigning a manufacturing line to a customer order is described herein, the scope of the invention includes using assigning multiple manufacturing lines to manufacture multiple items for a single customer order.

In step 410, the demand fulfillment system determines available inventory from both external material sources and in-house. In embodiments including in-transit inventory, in-transit inventory is considered a part of available inventory. Available in-house inventory typically excludes in-house inventory already assigned to customer orders.

In step 420, a work schedule and material requirements are produced. In the preferred embodiment, customer orders are used to produce the work schedule and material requirements to ensure that the manufacturing of items is responsive to customer demand. When processing of customer orders to produce the work schedule and material requirements is complete, work is initiated according to the work schedule in step 430.

In step 440, a material delivery schedule and material requests are generated. In step 450, the demand fulfillment system sends material requests for materials on the material delivery schedule in-house and to hubs. In step 460, the material is delivered to operations and/or manufacturing lines according to the material delivery schedule.

Figure 5:
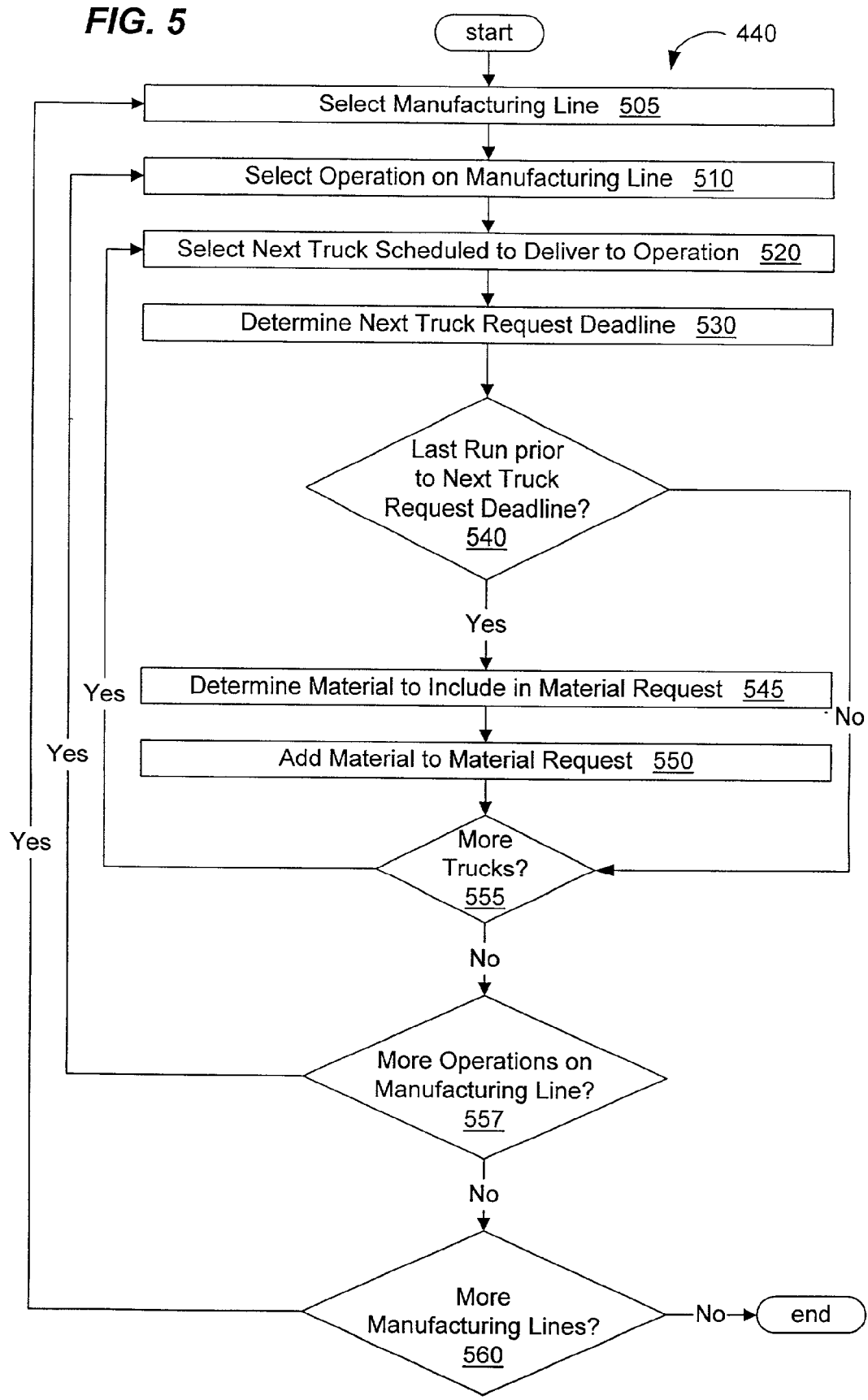
FIG. 5 shows a flowchart for the Generate Material Delivery Schedule and Material Requests step of FIG. 4.

FIG. 5 shows a flowchart for the Generate Material Delivery Schedule and Material Requests step 440. Demand fulfillment system 310 repeats step 440 at frequent time intervals for all manufacturing lines, material sources and truck schedules. These time intervals may be fixed (such as every 5 minutes) or may vary depending upon various factors.

The time intervals are designed to occur frequently so that step 440 is repeated essentially continuously, with delays only for set up and processing time of the delivery scheduling software 370. Repetitive scheduling ensures that materials are delivered to the manufacturing lines on a just-in-time basis and that material requests are made at the last possible time that meets the established truck arrival schedules for the material sources.

The example of FIG. 5 assumes that deliveries are scheduled for multiple operations occurring on at least one manufacturing line, where each manufacturing line includes at least one operation and may include multiple operations. In step 505, a manufacturing line is selected; in step 510, an operation on the manufacturing line is selected; and in step 520, the next truck scheduled to arrive for the selected operation on the selected manufacturing line is selected for scheduling deliveries. For manufacturing lines having only one operation, step 510 and step 557 will have no effect.

In step 530, the request deadline for the next truck is determined. The truck request deadline may be obtained from a truck arrival schedule or calculated using known replenishment times and truck arrival times. In step 540, demand fulfillment system 310 determines whether the current run of step 440 is the last run prior to the selected truck's request deadline. If so, the current run is the last opportunity for requesting the material and a material request will be generated. If not, the current run is not the last opportunity for requesting the material, no material request is generated, and control transitions to step 555 to process another truck for the operation on the manufacturing line.

If in step 540, the current run of step 440 is the last run prior to the selected truck's request deadline, control transitions to step 545. In step 545, the materials to include in the material request for the next truck are determined. In step 550, the materials determined in step 545 are added to the material request. Control then transitions to step 555 to process another truck for the operation on the manufacturing line.

In step 555, a determination is made whether trucks remain to be processed for the operation on the manufacturing line. If so, control returns to step 520 to process another truck. If not, control transitions to step 557, where a determination is made whether operations remain to be processed for the manufacturing line. If so, control returns to step 510 to process another operation. If not, control transitions to step 560.

In step 560, a determination is made whether manufacturing lines remain for which a material delivery schedule and material requests are to be generated. If so, control transitions to step 510 to process another manufacturing line. If not, the run of step 440 is completed. Another run of step 440 may be initiated at a later time.

Figure 6:
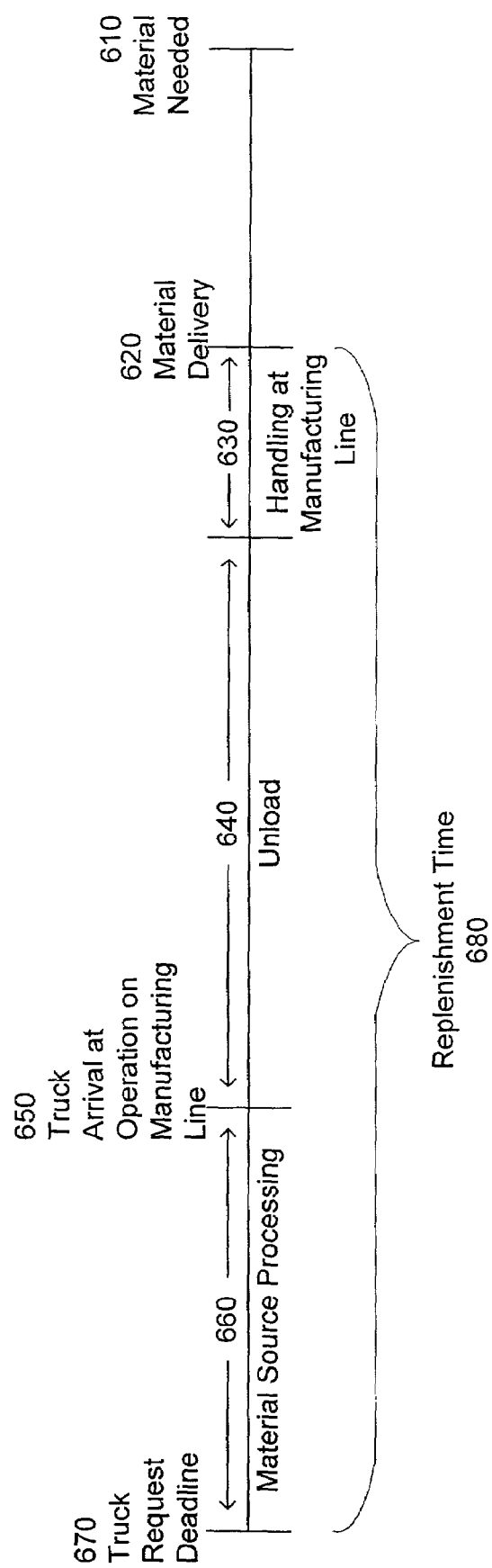
FIG. 6 shows a timeline for placing a material request for a truck delivering material from available inventory to an operation of a manufacturing line.

FIG. 6 shows an example of a timeline for placing a material request for a truck delivering material from available inventory to a manufacturing line. Assume that the material is needed at need-by time 610. For the material to be available at need-by time 610, the material must be delivered to the operation at the manufacturing line at material delivery time 620. Material delivery time 620 may be the same as need-by time 610. However, in a factory using regularly scheduled deliveries of material to operations on manufacturing lines, material delivery time 620 will be the scheduled delivery time to the operation prior to need-by time 610.

Because the manufacturing lines do not have permanent storage rooms for inventory, several lead times may need to be factored into achieving a particular material delivery time 620. Time may be necessary for unloading the truck (or other transportation mechanism), shown as unload time 640. Optionally, time may be required for handling the material once it is unloaded at the operation on the manufacturing line, as shown at handling time 630. For example, material may need to be divided into different bins at the operation. Handling time 630 and unload time 640 may not be applicable for some material deliveries.

The truck containing the material must therefore arrive at the operation of the manufacturing line at truck arrival time 650. For some factories, truck arrival schedules are negotiated between an external material source and the manufacturer to ensure a regular supply of materials, which is especially important for the mass-production of commodities. In such cases, truck request deadlines may be established to ensure that if material is requested by the request deadline, the material is included in the corresponding delivery by the truck.

Time for a material source to receive and process the material request must be planned, as shown in material source processing time 660. The request deadline 670 for all materials to be delivered by the truck therefore takes into account all time elapsed in the timeline from material source processing time 670 through material delivery time 620. This replenishment time 680 is the minimum time that must be allowed when placing an order for material expected to arrive at material delivery time 620. In different embodiments of the invention, the components comprising replenishment time may be different.

If a buffer of additional inventory is desired in preparation for possible changes in the work schedule, the material delivery schedule, and/or the material requirements for the operation on the manufacturing line, a buffer time may be added to the material need-by time to establish an extended need-by time for the material. In such a case, the material request would be deferred to the latest truck that can deliver the material prior to the extended need-by time. In effect, extra replenishment time is included for the material delivery.

Figure 7:
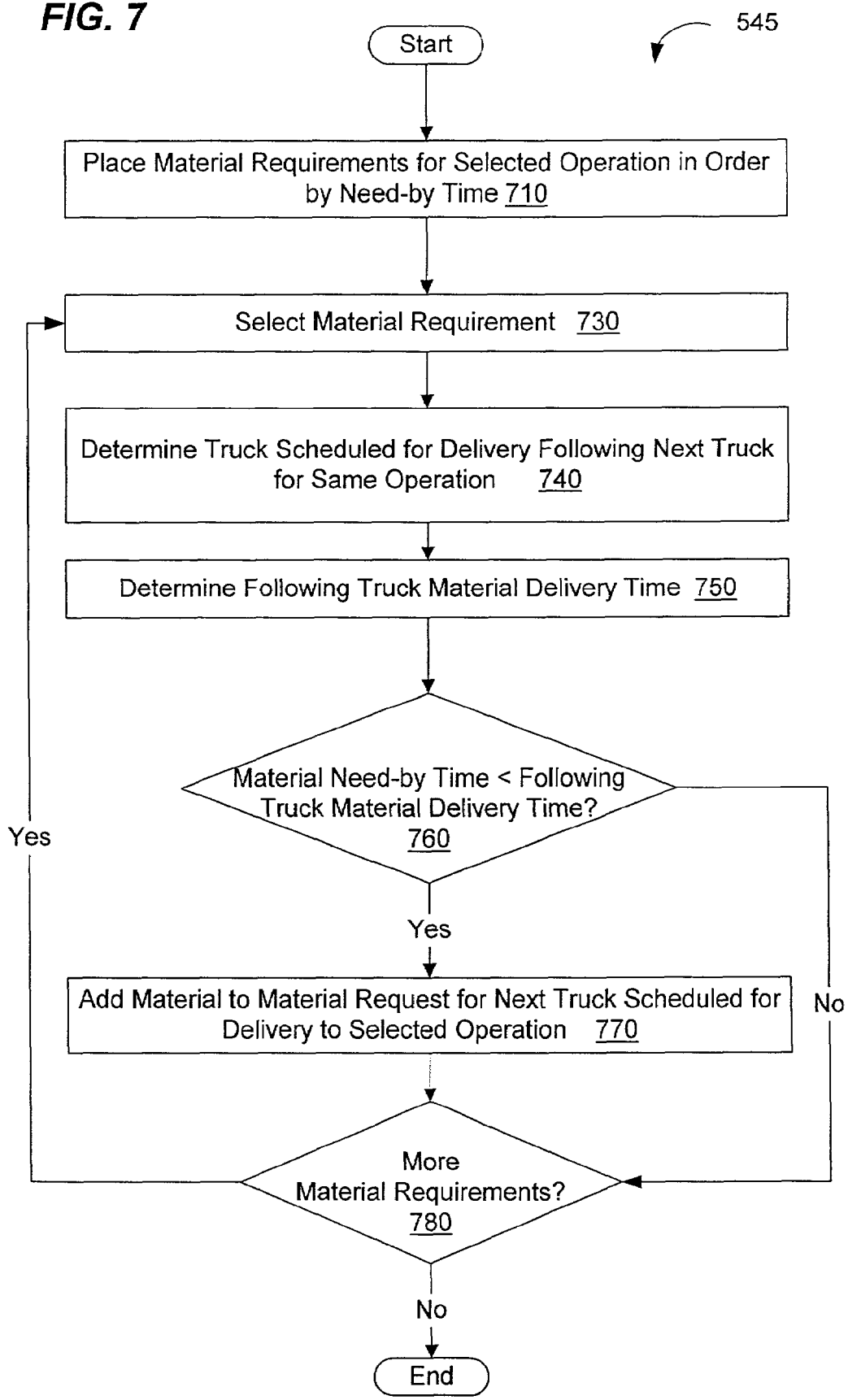
FIG. 7 shows a flowchart of the Determine Material to Include in Material Request step of FIG. 5.

FIG. 7 shows a flowchart of the Determine Material to Include in Material Request step 545. Step 545 determines the material to be included in a material request for the truck selected in step 520 for the operation selected in step 510 for the manufacturing line selected in step 505 of FIG. 5. In step 710, material requirements for the selected operation are ordered by need-by time. A material requirement is selected in step 730, preferably according to the next need-by time.

In step 740, the following truck scheduled to deliver to the selected operation at the selected manufacturing line after the next truck is identified. The reason for identifying the following truck is to determine whether the later truck can deliver the material by the time it is needed to manufacture the item. If a later truck can deliver the material by the need-by time, processing the material requirement is delayed and the material request is deferred to the next truck that can deliver the material on time. This deferral minimizes the length of time that inventory is held at the manufacturing line while still delivering the material on time.

In step 750, the material delivery time for the following truck is determined. In step 760, a determination is made whether the material of the selected material requirement is needed prior to the material delivery time for the following truck. If so, control transitions to step 770 and the material is added to the material request for the next truck. If not, the material can be delivered later and control transitions to step 780 to process another material requirement.

In step 780, a determination is made whether additional material requirements exist for the operation. If so, control returns to step 730 to select another material requirement. If not, material requests for the next truck are complete. Control returns to begin Add Material to Material Request step 550 of FIG. 5.

Figure 8:
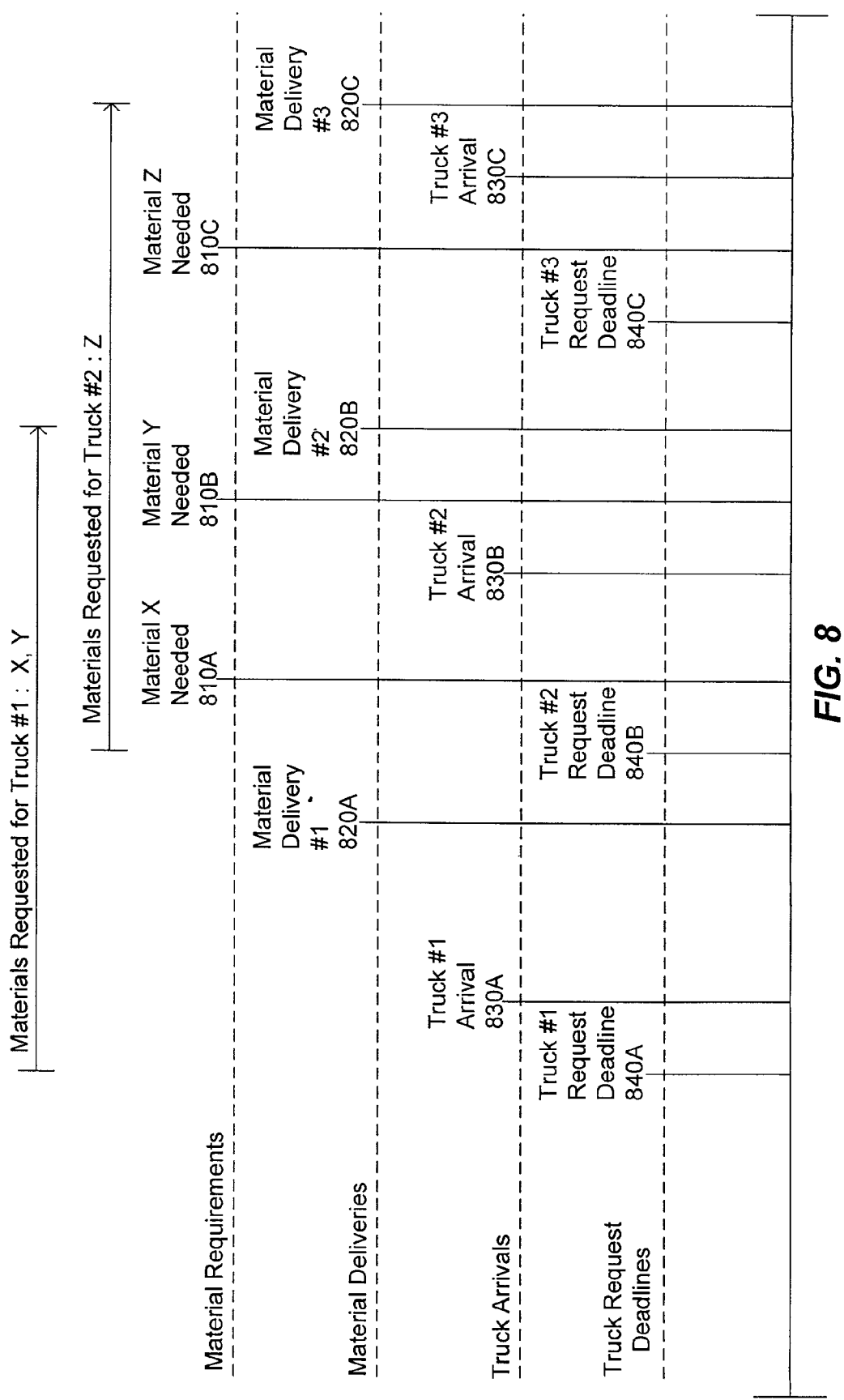
FIG. 8 shows an example of placing material requests for several deliveries of materials.

FIG. 8 is an example of placing material requests for several deliveries of materials. In this example, materials to be requested include material requirements 810A, 810B, and 810C. The expected arrival times for trucks include truck arrivals 830A, 830B and 830C. Taking into account unloading and handling time, material deliveries occur at material delivery times 820A, 820B and 820C. Truck request deadlines 840A, 840B and 840C are determined using the material delivery times and the necessary replenishment times for each truck.

The material request made for truck #1 at truck deadline 840A is for materials that must arrive by material delivery time 820A. Therefore, the material request made at truck deadline 840 will include materials X and Y (all materials needed prior to the next material delivery 820B). The material request for truck #1 will not include material Z needed at need-by time 810C because it can be delivered on a later truck (as part of material delivery 820B).

The materials requested for truck #2 include materials needed prior to material delivery time 820C for truck #3, only material Z. Materials X and Y have already been delivered prior to the material delivery time 820B for truck #2 and therefore are not included in another material request.

The present invention provides several advantages, including providing a material delivery schedule that can be altered on an as-needed basis as material requirements change for an operation on a manufacturing line. Another advantage is that scheduling work and determining material requirements also can be performed on an as-needed basis rather than being limited to a fixed schedule. Furthermore, by delaying material requests to the last possible moment, the invention provides maximum flexibility in adapting to changing material requirements for each operation on a manufacturing line.

Repeatedly generating the material delivery schedule and material requests ensures that truck request deadlines are met. Material requests can be provided to the material source for a particular truck without requiring the material source to allocate the materials to be different trucks or to filter out deliveries that have already occurred. Providing material requests for a particular truck helps the manufacturer to ensure that its material needs are met on a timely basis.

Finally, the present invention enables material requests to be made for a buffer amount of material that can be used for work scheduled following the material delivery to anticipate changes in material requirements or in the work schedule for the manufacturing line.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the described embodiment generates a schedule that reflects all outstanding customer orders and all inventory which is then analyzed to produce an work schedule and a material delivery schedule. Other embodiments may use only a subset of customer orders and inventory to generate one or more schedules. Such variations are contemplated within the scope of the invention.

The above-described embodiments describe scheduling blocks as occurring at fixed intervals such as two hours. The scope of the invention includes scheduling blocks at variable intervals that are determined during the manufacturing process.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Consequently, the invention is intended to be limited only by the spirit and scope of the appended claims, giving full cognizance to equivalents in all respects.

What is claimed is:

1. A method for scheduling deliveries of material comprising:
    obtaining a material requirement for an operation of at least one operation on a manufacturing line, the material requirement comprising an identified material and a material need-by time, the obtaining being performed by a module executing on a computer system;
    identifying a next truck scheduled for delivery to the operation, the next truck originating at a material source, the identifying being performed by a module executing on a computer system;
    determining whether a following truck scheduled for delivery to the operation after the next truck has a material delivery time before the material need-by time of the material requirement, the determining being performed by a module executing on a computer system, and
    when the following truck has a material delivery time before the material need-by time, delaying processing of the material requirement, and
    when the following truck has a material delivery time after the material need-by time, determining whether a later opportunity to request the identified material exists, and
    when a later opportunity exists, delaying requesting the identified material and scheduling a delivery of the identified material, and when a later opportunity does not exist, requesting the identified material by adding the identified material to a material request for the next truck and scheduling a delivery of the identified material from the material source to the operation on the next truck.

2. A method for scheduling deliveries of material comprising:

repeating a series of steps, the series comprising:

obtaining a material requirement for an operation on a manufacturing line from a plurality of material requirements, each material requirement of the plurality of material requirements comprising an identified material and a material need-by time, the obtaining being performed by a module executing on a computer system;

identifying a next truck scheduled for delivery to the operation, the next truck originating at a material source, the identifying being performed by a module executing on a computer system;

determining whether a following truck scheduled for delivery to the operation after the next truck has a material delivery time before the material need-by time of the material requirement, the determining being performed by a module executing on a computer system, and when the following truck has a material delivery time before the material need-by time, delaying processing of the material requirement, and when the following truck has a material delivery time after the material need-by time, determining whether a later opportunity to request the identified material exists, and when a later opportunity exists, delaying requesting the identified material and scheduling a delivery of the identified material, and when a later opportunity does not exist, requesting the identified material by adding the identified material to a material request for the next truck and scheduling a delivery of the identified material from the material source to the operation on the next truck.

3. The method of claim 2 wherein the repeating the series of steps is performed at a fixed time interval.

4. The method of claim 2 wherein the repeating the series of steps is performed essentially continuously.

5. A method for scheduling deliveries of material comprising:

repeating a series of steps essentially continuously, the series comprising:

obtaining a material requirement for an operation on a manufacturing line from a plurality of material requirements, each material requirement of the plurality of material requirements comprising an identified material and a material need-by time, the obtaining being performed by a module executing on a computer system;

identifying a next truck scheduled for delivery to the operation, the next truck originating at a material source, the identifying being performed by a module executing on a computer system;

determining whether a following truck scheduled for delivery to the operation after the next truck has a material delivery time before the material need-by time of the material requirement, the determining being performed by a module executing on a computer system, and when the following truck has a material delivery time before the material need-by time, delaying processing of the material requirement, and when the following truck has a material delivery time after the material need-by time, determining whether a later opportunity to request the identified material exists, and when a later opportunity exists, delaying requesting the identified material and scheduling a delivery of the identified material, and when a later opportunity does not exist, requesting the identified material by adding the identified material to a material request for the next truck and scheduling a delivery of the identified material from the material source to the operation on the next truck.

6. A computer system comprising:

a processor;

a memory, the memory storing instructions to be executed by the processor, the instructions comprising:

instructions for repeating a series of steps essentially continuously;

instructions for each step in the series of steps comprising:

instructions for obtaining a material requirement for an operation of at least one operation on a manufacturing line, the material requirement comprising an identified material and a material need-by time;

instructions for identifying a next truck scheduled for delivery to the operation, the next truck originating at a material source;

instructions for determining whether a following truck scheduled for delivery to the operation after the next truck has a material delivery time before the material need-by time of the material requirement;

instructions for delaying processing of the material requirement when the following truck has a material delivery time before the material need-by time;

instructions for determining whether a later opportunity to request the identified material exists when the following truck has a material delivery time after the material need-by time;

instructions for delaying requesting the identified material and scheduling a delivery of the identified material when a later opportunity exists;

instructions for requesting the identified material by adding the identified material to a material request for the next truck when a later opportunity does not exist; and instructions for scheduling a delivery of the identified material from the material source to the operation on the next truck when a later opportunity does not exist.

7. A computer program product for causing a computer system to execute instructions comprising:

instructions for repeating a series of steps essentially continuously;

instructions for each step in the series of steps comprising:

instructions for obtaining a material requirement for an operation of at least one operation on a manufacturing line, the material requirement comprising an identified material and a material need-by time;

instructions for identifying a next truck scheduled for delivery to the operation, the next truck originating at a material source;

instructions for determining whether a following truck scheduled for delivery to the operation after the next truck has a material delivery time before the material need-by time of the material requirement;

instructions for delaying processing of the material requirement when the following truck has a material delivery time before the material need-by time;

instructions for determining whether a later opportunity to request the identified material exists when the following truck has a material delivery time after the material need-by time;

instructions for delaying requesting the identified material and scheduling a delivery of the identified material when a later opportunity exists;

instructions for requesting the identified material by adding the identified material to a material request for the next truck when a later opportunity does not exist; and instructions for scheduling a delivery of the identified material from the material source to the operation on the next truck when a later opportunity does not exist; and a computer-readable medium for storing the instructions for repeating, the instructions for obtaining, the instructions for identifying, the instructions for determining whether a following truck scheduled for delivery to the operation after the next truck has a material delivery time before the material need-by time of the material requirement, the instructions for delaying processing, the instructions for determining whether a later opportunity to request the identified material exists when the following truck has a material delivery time after the material need-by time, the instructions for delaying requesting, and the instructions for requesting, and the instructions for scheduling.

8. A signal embodied in a computer readable medium, the signal causing a computer system to execute instructions comprising:

instructions for repeating a series of steps essentially continuously;

instructions for each step in the series of steps comprising:

instructions for obtaining a material requirement for an operation of at least one operation on a manufacturing line, the material requirement comprising an identified material and a material need-by time;

instructions for identifying a next truck scheduled for delivery to the operation, the next truck originating at a material source;

instructions for determining whether a following truck scheduled for delivery to the operation after the next truck has a material delivery time before the material need-by time of the material requirement;

instructions for delaying processing of the material requirement when the following truck has a material delivery time before the material need-by time;

instructions for determining whether a later opportunity to request the identified material exists when the following truck has a material delivery time after the material need-by time;

instructions for delaying requesting the identified material and scheduling a delivery of the identified material when a later opportunity exists;

instructions for requesting the identified material by adding the identified material to a material request for the next truck when a later opportunity does not exist; and instructions for scheduling a delivery of the identified material from the material source to the operation on the next truck when a later opportunity does not exist.

* * * * *